(12) United States Patent
Hara et al.

(10) Patent No.: US 12,473,207 B2
(45) Date of Patent: Nov. 18, 2025

(54) TANTALATE DISPERSION AND TANTALATE COMPOUND

(71) Applicant: Mitsui Mining & Smelting Co., Ltd., Tokyo (JP)

(72) Inventors: Syuhei Hara, Omuta (JP); Akinori Kumagai, Omuta (JP)

(73) Assignee: MITSUI MINING & SMELTING CO., LTD. (JP)

( * ) Notice: Subject to any disclaimer, the term of this patent is extended or adjusted under 35 U.S.C. 154(b) by 273 days.

(21) Appl. No.: 18/014,617

(22) PCT Filed: Jun. 3, 2021

(86) PCT No.: PCT/JP2021/021134
§ 371 (c)(1),
(2) Date: Jan. 5, 2023

(87) PCT Pub. No.: WO2022/018980
PCT Pub. Date: Jan. 27, 2022

(65) Prior Publication Data
US 2023/0295003 A1 Sep. 21, 2023

(30) Foreign Application Priority Data
Jul. 22, 2020 (JP) .................................. 2020-125669

(51) Int. Cl.
*C01G 35/00* (2006.01)
(52) U.S. Cl.
CPC ........ *C01G 35/006* (2013.01); *C01P 2002/72* (2013.01)

(58) Field of Classification Search
None
See application file for complete search history.

(56) References Cited

U.S. PATENT DOCUMENTS 3,366,510 A * 1/1968 Daendliker ............ C01G 35/00
423/594.15
5,635,146 A 6/1997 Singh et al.
6,338,832 B1 1/2002 Brown et al.
(Continued)

FOREIGN PATENT DOCUMENTS

CN 1442370 A 9/2003
CN 1800031 A 7/2006
(Continued)

OTHER PUBLICATIONS

International Search Report (English and Japanese) issued in PCT/JP2021/021134, mailed Jul. 13, 2021; ISA/JP (5 pages).

*Primary Examiner* — Anthony J Zimmer
*Assistant Examiner* — Zachary John Baum
(74) *Attorney, Agent, or Firm* — Harness, Dickey & Pierce, P.L.C.

(57) ABSTRACT

Provided is a novel tantalate dispersion containing no hardly-volatile organic component and having high dispersibility in water, the tantalate dispersion containing tantalum or/and tantalate and amine in water, the tantalate dispersion having an intensity ratio (5.5°/29°) of an intensity at 2θ=5.5° to an intensity at 2θ=29° being 1.00 or more in an X-ray diffraction pattern obtained by subjecting a powder obtained by drying the tantalate dispersion to powder X-ray diffraction measurement using CuKα rays.

3 Claims, 4 Drawing Sheets

(56) References Cited

U.S. PATENT DOCUMENTS

2011/0105666 A1    5/2011    Okada
2011/0135878 A1    6/2011    Kimura et al.

FOREIGN PATENT DOCUMENTS

| CN | 101319393 A | 12/2008 |
|---|---|---|
| JP | H08-143315 A | 6/1996 |
| JP | 2006-117460 A | 5/2006 |
| JP | 2006-182714 A | 7/2006 |
| JP | 2007-005161 A | 1/2007 |
| JP | 2010-188226 A | 9/2010 |
| JP | 2011-116966 A | 6/2011 |
| JP | 2011-157553 A | 8/2011 |
| RU | 2639567 C1 | 12/2017 |

\* cited by examiner

TANTALATE DISPERSION AND TANTALATE COMPOUND

CROSS REFERENCE TO RELATED APPLICATIONS

This application is a U.S. National Phase Application under 35 U.S.C. 371 of International Application No. PCT/JP2021/021134, filed on Jun. 3, 2021, which claims priority to Japanese Patent Application No. 2020-125669, filed on Jul. 22, 2020. The entire disclosures of the above applications are expressly incorporated by reference herein

BACKGROUND

Technical Field

The present invention relates to a tantalate dispersion containing tantalum or/and tantalate in water, and a tantalate compound.

Related Art

Tantalum is a material used in various industrial applications since it has a chemical resistance comparable to that of noble metals, has a body-centered cubic crystal structure, and can be easily processed even at room temperature or lower. Materials containing tantalum are used in various fields, such as heat exchangers in chemical plants, charge carriers in high-temperature industrial furnace installations, medical implants, and capacitors in electronic components.

In recent years, tantalum oxide has also attracted attention as a material for optoelectronics, catalysts, and other applications.

For example, Japanese Unexamined Patent Publication No. H08-143315 discloses a tantalum oxide sol having a particle diameter of 500 Å or less, which is composed of oxalic acid and tantalum oxide in a $(HCOO)_2/Ta_2O_5$ molar ratio range of 0.5 to 5, and also discloses a method for producing a tantalum oxide sol including adding oxalic acid to an active tantalum hydroxide compound such that the $(HCOO)_2/Ta_2O_5$ molar ratio is in a range of 5.0 to 30, and subjecting the mixture to a heating reaction at a temperature of 90° C. or higher for 2 hours or more.

Japanese Unexamined Patent Publication No. 2006-117460 discloses a tantalum oxide sol containing at least one oxycarboxylic acid selected from citric acid, tartaric acid, and malic acid in an oxycarboxylic acid/$Ta_2O$ (molar ratio) range of 0.05 to 10, and also discloses a method for producing a tantalum oxide sol including reacting a tantalum hydrofluoric acid solution with an alkaline solution in the presence of at least one oxycarboxylic acid selected from citric acid, tartaric acid, and malic acid.

Japanese Unexamined Patent Publication No. 2006-182714 discloses a method for producing an organic tantalum aqueous solution including dissolving $TaCl_5$ in a small amount of methanol, adding water thereto, adding ammonia water thereto to form a precipitate of tantalate $Ta_2O_5 \cdot nH_2O$, washing the precipitate with water to completely remove chloride ions, and then adding water, hydroxycarboxylic acid or EDTA (ethylenediaminetetraacetic acid), amine (ammonia water or guanidine carbonate), and hydrogen peroxide water thereto to dissolve the precipitate.

Japanese Unexamined Patent Publication No. 2010-188226 discloses a method for producing a photocatalytic thin film including mixing a solution or dispersion of a tetravalent titanium compound and a solution or dispersion of a pentavalent tantalum compound with a water-soluble reducing agent, heating the mixture at a temperature of 100° C. to 250° C. to obtain a titanium oxide powder, pulverizing the powder into fine particles having an average particle diameter of 100 nm or less and dispersing in a solvent to obtain a dispersion, and coating the dispersion on a substrate and then drying to form a film. In Japanese Unexamined Patent Publication No. 2010-188226, although not a tantalate compound itself, a titanium oxide-based oxide containing tantalum oxide as an intermediate substance is provided.

If tantalate dispersions containing tantalum or/and tantalate in water, especially tantalate dispersions composed of hydrates of tantalum or/and tantalate, or/and ions thereof dispersed in water can be industrially provided, they can be expected to be effectively used in various industrial applications, such as coating the surface of various parts to form a surface layer having high chemical resistance, use as additives for catalysts, and industrial use as alkali metal tantalum salts by reacting with alkali metals.

However, many of the conventionally known tantalate dispersions, such as the tantalum oxide sols and the organic tantalum aqueous solution disclosed in Japanese Unexamined Patent Publication No. H08-143315, Japanese Unexamined Patent Publication No. 2006-117460, and Japanese Unexamined Patent Publication No. 2006-182714, contain hardly-volatile organic components such as oxycarboxylic acid, oxalic acid, and EDTA (ethylenediaminetetraacetic acid), which may interfere with film formation or inhibit catalytic action when used as additives for catalysts, thus hindering their industrial use.

Also, if tantalate compounds having high reactivity can be industrially provided, they can be expected to be effectively used in various industrial applications, such as use as additives for catalysts and industrial use as alkali metal tantalates by reacting with alkali metal compounds.

However, the tantalate compound disclosed in Japanese Unexamined Patent Publication No. 2010-188226 has a problem of insufficient reactivity with alkali metal compounds.

Accordingly, an object of the present invention is to provide a novel tantalate dispersion containing no hardly-volatile organic components such as oxycarboxylic acid, oxalic acid, and EDTA and having high dispersibility in water, and a method for producing the same, and to provide a novel tantalate compound having high reactivity with alkali metal compounds.

SUMMARY

The present invention proposes a tantalate dispersion containing tantalum or/and tantalate and amine in water, and having an intensity ratio (5.5°/29°) of an intensity at $2\theta=5.5°$ to an intensity at $2\theta=29°$ being 1.00 or more in an X-ray diffraction pattern obtained by subjecting a powder obtained by drying the tantalate dispersion to powder X-ray diffraction measurement using $CuK\alpha$ rays.

The present invention also proposes a method for producing a tantalate dispersion including adding a tantalum salt solution to an amine aqueous solution to obtain a primary reaction liquid, adding the primary reaction liquid to ammonia water to obtain a secondary reaction solution, washing a tantalum-containing precipitate formed in the secondary reaction solution, and mixing the washed tantalum-containing precipitate with amine and water to produce a tantalate dispersion.

The present invention also proposes a tantalate compound having an intensity ratio (5.5°/29°) of an intensity at $2\theta=5.5°$ to an intensity at 2θ=29° being 0.90 or more in an X-ray diffraction pattern, as measured by powder X-ray diffraction using CuKα rays.

Effect of the Invention

The tantalate dispersion proposed by the present invention is characterized in that it contains no hardly-volatile organic components such as oxycarboxylic acid, oxalic acid, and EDTA, and has high dispersibility in water. In particular, by increasing the amine content, the dispersibility in water can be further enhanced to provide an aqueous solution having extremely high transmittance. Therefore, the tantalate dispersion proposed by the present invention can be effectively used in various industrial applications, such as coating the surface of various parts to form a surface layer having predetermined functions such as chemical resistance and use as additives for catalysts. In addition, the tantalate dispersion proposed by the present invention has high reactivity with alkali metal salts such as sodium hydroxide and potassium hydroxide, and thus an alkali metal tantalate can be easily obtained by simply mixing and reacting with an alkali metal salt such as sodium hydroxide or potassium hydroxide, without using an autoclave or the like to react under high temperature and pressure conditions.

The tantalate compound proposed by the present invention also has high reactivity with alkali metal salts such as sodium hydroxide and potassium hydroxide, and thus an alkali metal tantalate can be easily obtained by simply mixing and reacting with an alkali metal compound such as sodium hydroxide or potassium hydroxide in a liquid, without using an autoclave or the like to react under high temperature and pressure conditions.

DETAILED DESCRIPTION

Figure 1:
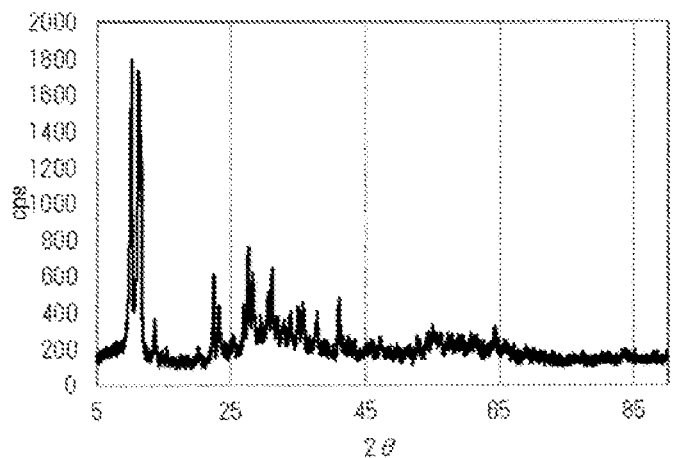
FIG. 1 is an X-ray diffraction (XRD) pattern of a precipitate obtained by subjecting a tantalate dispersion (sample) obtained in Example 1 to a reactivity test with NaOH.

Next, the present invention will be described based on exemplary embodiments. However, the present invention is not limited to the embodiments described below.

<Present Tantalate Dispersion>

The tantalate dispersion according to an example of the embodiments of the present invention (referred to as "present tantalate dispersion") is a tantalate dispersion containing tantalum or/and tantalate and amine in water.

In the present invention, the term "tantalate dispersion" refers to a liquid in which substances derived from tantalum or/and tantalate are dispersed in water without precipitation, or a liquid in which tantalum or/and tantalate is dissolved in water to form an aqueous solution.

For example, when no precipitation is visually observed after still-standing at room temperature for 24 hours or longer, it can be recognized that substances derived from tantalum or/and tantalate are dispersed in water without precipitation.

Examples of the state of the present tantalate dispersion include a liquid state such as water, a paste state, and a suspension state (sol).

Whether the present tantalate dispersion contains tantalum or/and tantalate in water can be confirmed by ICP light emission spectrometry (high frequency inductively coupled plasma light emission spectrometry) or the like.

In addition, whether the present tantalate dispersion contains amine in water can be confirmed by GC-MS or the like.

In the present tantalate dispersion, how the tantalum or/and tantalate is present in water is under investigation. Although not technically proven, it can be presumed that the tantalum or/and tantalate is present as hydrates of tantalum or/and tantalate, or/and ions thereof in the present tantalate dispersion. In particular, based on the characteristics of the XRD patterns described below, it can be presumed that the tantalum or/and tantalate is present in water as ions having a polyoxometalate structure formed by ion-bonding with amine.

The present tantalate dispersion preferably contains tantalum in an amount of 0.1% by mass to 40% by mass in terms of $Ta_2O_5$, more preferably 0.5% by mass or more, and even more preferably 1% by mass or more. In addition, it is more preferable to contain tantalum in an amount of 30% by mass or less, more preferably 20% by mass or less.

The tantalum or/and tantalate in the present tantalate dispersion is not necessarily present in the form of $Ta_2O_5$. In the present invention, the reason why the content of tantalum in the present tantalate dispersion is indicated in terms of $Ta_2O_5$ is based on the practice of the industry when indicating the Ta concentration.

The present tantalate dispersion preferably contains amine in an amount of 0.01% by mass to 30% by mass.

When the amount of amine is large, the dispersibility or/and solubility of tantalum or/and tantalate in water can be enhanced. Although not technically proven, it can be presumed that the ion-bonding of amine with tantalate increases the solubility in water. From such a viewpoint, the present tantalate dispersion preferably contains amine in an amount of 0.01% by mass or more, more preferably 0.1% by mass or more, and even more preferably 0.5% by mass or more.

On the other hand, too much amount of amine may cause problems such as interfering with film formation and inhibiting catalytic action. Therefore, the present tantalate dispersion preferably contains amine in an amount of 30% by mass or less, more preferably 25% by mass or less, and even more preferably 20% by mass or less.

For example, when the concentration of amine in the present tantalate dispersion having a tantalum pentoxide concentration of 9% by mass is set to 5% by mass or more, the tantalum or/and tantalate can be dissolved in water to form a dispersion having extremely high transmittance, that is, an aqueous solution having a transmittance at 400 nm of 40% or more, more preferably 50% or more.

The present tantalate dispersion preferably contains 55 to 100 parts by mass of amine per 100 parts by mass of tantalum (in terms of $Ta_2O_5$). By containing amine in such a ratio, the tantalum or/and tantalate can be dissolved in water to form a dispersion having extremely high transmittance, that is, an aqueous solution having a transmittance at 400 nm of 40% or more, more preferably 50% or more.

In the present invention, a dispersion having a transmittance at 400 nm of 40% or more is referred to as an aqueous solution.

Preferred examples of the amine contained in the present tantalate dispersion include alkylamines.

As the alkylamines, those having 1 to 3 alkyl groups can be preferably used. When the number of alkyl groups is 2 to 3, all of those alkyl groups may be the same or different. As the alkyl groups of the alkylamines, alkyl groups having 1 to 6 carbon atoms, preferably 4 or less, more preferably 3 or less, and even more preferably 2 or less, are preferred from the viewpoint of solubility.

Specific examples of the alkylamines include methylamine, dimethylamine, trimethylamine, ethylamine, methylethylamine, diethylamine, triethylamine, methyldiethylamine, dimethylethylamine, n-propylamine, di-n-propylamine, tri-n-propylamine, iso-propylamine, di-iso-propylamine, tri-iso-propylamine, n-butylamine, di-n-butylamine, tri-n-butylamine, iso-butylamine, di-iso-butylamine, tri-iso-butylamine, tert-butylamine, n-pentylamine, and n-hexylamine.

Among them, methylamine, dimethylamine, trimethylamine, ethylamine, methylethylamine, diethylamine, triethylamine, methyldiethylamine, and dimethylethylamine are preferred; and methylamine, dimethylamine, and trimethylamine are more preferred.

The present tantalate dispersion preferably has an intensity ratio (5.5°/29°) of an intensity at 2θ=5.5° to an intensity at 2θ=29° being 1.00 or more in an X-ray diffraction pattern obtained by subjecting a powder obtained by drying the present tantalate dispersion to powder X-ray diffraction measurement using CuKα rays.

It has been confirmed that, when the intensity ratio (5.5°/29°) of the intensity at 2θ=5.5° to the intensity at 2θ=29° is large, the dispersibility of the present tantalate dispersion is higher, and thus the transmittance of the present tantalate dispersion becomes higher. In the X-ray diffraction pattern, the high intensity of the peak appearing at an angle lower than 2θ=15° has been confirmed as one of the characteristics of a polyoxometalate structure. Therefore, it can be presumed that the higher the intensity ratio (5.5°/29°), the higher the ratio of the polyoxometalate structure, the higher the dispersibility of the present tantalate dispersion, and the higher the transmittance.

From such a viewpoint, the intensity ratio (5.5°/29°) in the present tantalate dispersion is preferably 1.00 or more, more preferably 1.01 or more, even more preferably 1.02 or more, even more preferably 1.03 or more, even more preferably 1.06 or more, and still more preferably 1.10 or more. The upper limit thereof is expected to be approximately 2.00.

The intensity at 2θ=29° and the intensity at 2θ=5.5° are not the intensity at the peak position near the angle, but the intensity at the specified angle.

The above-mentioned polyoxometalate structure can be presumed to be a structure represented by the formula $[Ta_xO_y]^{n-} \cdot mH_2O$ ($6 \leq x \leq 10$, $19 \leq y \leq 28$, $n=6$, and m is an integer of 0 to 50). Specific examples of ions having the polyoxometalate structure include hydrous compounds having a structure represented by $[Ta_6O_{19}]^{6-} \cdot mH_2O$.

However, it is not limited to the hydrous compounds. The basis for this presumption includes, in addition to the characteristics in the X-ray diffraction pattern, high reactivity with alkali metal compounds and the fact that when mixed and reacted with NaOH, LiOH, or KOH, a compound having a polyoxometalate structure can be obtained.

Other Components

The present tantalate dispersion may have a composition containing no components other than hydrates of tantalum or/and tantalate, or/and ions thereof, and amine in water.

On the other hand, the present tantalate dispersion may contain components other than tantalum or/and tantalate and amine (referred to as "other components") to the extent that they do not interfere with the effect. For example, as the other components, additives such as ammonia, inorganic dispersants, and pH adjusters may be contained. However, it is not limited to these. The content of the other components in the present tantalate dispersion is preferably less than 5% by mass, more preferably less than 4% by mass, and even more preferably less than 3% by mass.

It is also assumed that the present tantalate dispersion contains unavoidable impurities, not intentionally. In this case, the content of unavoidable impurities is preferably less than 0.01% by mass.

One of the characteristics of the present tantalate dispersion is that it contains no hardly-volatile organic components. When the present tantalate dispersion contains no hardly-volatile organic components, it can be dried at a relatively low temperature (100° C. or less) to form a film, and it can also be effectively used for various applications such as catalyst raw materials since it contains no impurities.

In the present invention, the term "hardly-volatile organic components" refers to organic substances having a volatilization temperature of 110° C. or higher, such as oxycarboxylic acid, oxalic acid, and EDTA.

Whether the present tantalate dispersion "contains no hardly-volatile organic components" can be confirmed from the production method. If the production method is unknown, it can be confirmed by analyzing the presence or absence of the hardly-volatile organic components using, for example, gas chromatography, nuclear magnetic resonance (NMR), or GC-MS.

In this case, the "containing no hardly-volatile organic components" in the present tantalate dispersion refers to a case where the content of organic substances having a volatilization temperature of 110° C. or higher is less than 1%.

(Transmittance)

The present tantalate dispersion has a transmittance at 400 nm of 40% or more, even 50% or more, even 60% or more, and even 70% or more.

The transmittance at 400 nm can be enhanced by increasing the content of amine in the present tantalate dispersion.

(Reactivity with Alkali Metal Compounds)

The present tantalate dispersion can be reacted by simply mixing with an alkali metal compound such as sodium hydroxide or potassium hydroxide and stirring, without heating to 80° C. or higher, to produce an alkali metal tantalum salt.

For example, 30 g of the present tantalate dispersion (25° C.) adjusted to a concentration containing 9% by mass of tantalum in terms of $Ta_2O_5$ is added with 30 mL of a sodium hydroxide aqueous solution (25° C.) having a concentration of 2.2% by mass while stirring and then stirred for 15 minutes after the addition to form a reaction liquid, the reaction liquid is added with 100 mL of ethanol to form a precipitate, and the precipitate is dried, thereby obtaining a powder composed of $Na_8Ta_6O_{19} \cdot 15H_2O$.

From the above, it can be said that the present tantalate dispersion has high reactivity with alkali metal salts, and can be thus reacted with a sodium hydroxide aqueous solution as described above to form a precipitate composed of $Na_8Ta_6O_{19} \cdot 15H_2O$.

For example, 30 g of the present tantalate dispersion (25° C.) adjusted to a concentration containing 9% by mass of tantalum in terms of $Ta_2O_5$ is added with 30 mL of a potassium hydroxide aqueous solution (25° C.) having a concentration of 3% by mass while stirring and then stirred for 15 minutes after the addition to form a reaction liquid, the reaction liquid is added with 100 mL of ethanol to form a precipitate, and the precipitate is dried, thereby obtaining a powder composed of $K_8Ta_6O_{19} \cdot 16H_2O$.

From the above, it can be said that the present tantalate dispersion has high reactivity with alkali metal salts, and can be thus reacted with a potassium hydroxide aqueous solution as described above to form a precipitate composed of $K_8Ta_6O_{19} \cdot 16H_2O$.

Generally, in order to obtain alkali metal tantalates such as $Na_8Ta_6O_{19} \cdot 15H_2O$ and $K_8Ta_6O_{19} \cdot 16H_2O$, it is necessary to mix tantalum hydroxide with a sodium hydroxide aqueous solution or a potassium hydroxide aqueous solution and react them under high temperature and pressure conditions using an autoclave or the like. It is thus difficult to produce alkali metal tantalates easily since the materials need to be heated to at least 80° C. or higher for reaction. On the other hand, since the present tantalate dispersion has high reactivity with alkali metal salts, tantalate hydrates ($Na_8Ta_6O_{19} \cdot 15H_2O$ and $K_8Ta_6O_{19} \cdot 16H_2O$) can be obtained by simply mixing and reacting with a sodium hydroxide aqueous solution or a potassium hydroxide aqueous solution, followed by cooling.

Whether the precipitate thus formed is a precipitate composed of $Na_8Ta_6O_{19} \cdot 15H_2O$ or $K_8Ta_6O_{19} \cdot 16H_2O$ can be identified by, for example, the following X-ray diffraction measurement (XRD). However, it is not limited to this method.

Specifically, the precipitate thus formed is measured by X-ray diffraction measurement under the following conditions, and compared with the XRD pattern of the ICDD card No. 00-024-1145, thereby identifying whether it is $Na_8Ta_6O_{19} \cdot 15H_2O$ or not. Also, by comparing with the XRD pattern of the ICDD card No. 01-073-8508, it can be identified whether it is $K_8Ta_6O_{19} \cdot 16H_2O$ or not.

<Present Dispersion Production Method>

Next, a preferred method for producing the present tantalate dispersion (referred to as "present dispersion production method") will be described.

Examples of the present dispersion production method include a method for producing a tantalate dispersion including adding a tantalum salt solution to an amine aqueous solution to obtain a primary reaction liquid (this treatment is referred to as "primary neutralization step"), adding the primary reaction liquid to ammonia water to obtain a secondary reaction solution (this treatment is referred to as "secondary neutralization step"), washing a tantalum-containing precipitate formed in the secondary reaction solution (this treatment is referred to as "washing step"), and mixing the washed tantalum-containing precipitate with amine and water to produce a tantalate dispersion (this treatment is referred to as "dispersion step").

It is also possible to produce the present tantalate dispersion by using the present tantalate compound described below and mixing the present tantalate compound with amine and water.

However, the present dispersion production method is not limited to these production methods.

Other steps or treatments can be appropriately added in the present dispersion production method as long as the above-mentioned steps are included.

For ease of explanation, the present dispersion production method will be described for each step below. However, each step can be a series of treatments in terms of the apparatus and time, or can be different treatment steps with different apparatuses and times.

(Tantalum Salt Solution)

The tantalum salt solution, which is a starting material, may be a solution in which tantalum is dissolved. Examples thereof include a tantalum chloride aqueous solution and a tantalum fluoride aqueous solution.

The tantalum chloride aqueous solution can be prepared by dissolving tantalum chloride ($TaCl_5$) into a small amount of methanol and then adding water.

The tantalum fluoride aqueous solution can be prepared by reacting tantalum, tantalum oxide, or tantalum hydroxide with hydrofluoric acid (HF) such as a hydrofluoric acid aqueous solution to form tantalum fluoride ($H_2TaF_7$), followed by dissolving in water.

The tantalum fluoride aqueous solution is preferably prepared by adding water (for example, pure water) so as to contain tantalum in an amount of 1 to 100 g/L in terms of $Ta_2O_5$. When the tantalum concentration is 1 g/L or more, a water-soluble tantalate compound hydrate can be obtained. Therefore, the tantalum concentration in the tantalum fluoride aqueous solution is preferably 1 g/L or more in terms of $Ta_2O_5$, and from the viewpoint of productivity, it is more preferably 10 g/L or more, and even more preferably 20 g/L or more. In addition, when the tantalum concentration is 100 g/L or less, a water-soluble tantalate compound hydrate can be obtained. Therefore, in order to synthesize a tantalate compound hydrate that is more reliably soluble in water, it is more preferably 90 g/L or less, even more preferably 80 g/L or less, and still more preferably 70 g/L or less.

The pH of the tantalum fluoride aqueous solution is preferably 2 or less, and more preferably 1 or less, from the viewpoint of completely dissolving tantalum or/and tantalum oxide.

(Primary Neutralization Step)

In the present dispersion production method, it is important to react a tantalum salt solution with an amine aqueous solution (primary neutralization) and then react them with ammonia water (secondary neutralization).

When only the primary neutralization with a tantalum salt solution and an amine aqueous solution is performed and the secondary neutralization with ammonia water is not performed, no precipitate may be formed or the amount of precipitate formed may be reduced, and the yield of the present tantalate dispersion tends to be low. Even if a precipitate is formed, the precipitate becomes a partially insoluble tantalate compound hydrate when directly proceeding to the washing step, and it is thus unable to obtain a highly dispersible tantalate dispersion.

Also, when the order of the primary neutralization and the secondary neutralization is reversed to react a tantalum salt solution with ammonia water and then with an amine aqueous solution, tantalum or/and tantalate cannot be suitably dispersed in water, much less formed into an aqueous solution, in the subsequent dispersion step.

In the primary neutralization step, reverse neutralization in which a tantalum salt solution such as a tantalum fluoride aqueous solution is added to an amine aqueous solution for reaction is preferably performed.

With normal neutralization in which an amine aqueous solution is added to a tantalum salt solution such as a tantalum fluoride aqueous solution, tantalum or/and tantalate cannot be suitably dispersed in water, much less formed into an aqueous solution, in the subsequent dispersion step.

With the reverse neutralization, it is presumed that the structure of tantalum or/and tantalate becomes a structure that is more soluble in water.

Preferred examples of the amine in the amine aqueous solution used in the primary neutralization step include alkylamines.

As the alkylamines, those having 1 to 3 alkyl groups can be preferably used. When the number of alkyl groups is 2 to 3, all of those alkyl groups may be the same or different. As the alkyl groups of the alkylamines, alkyl groups having 1 to 6 carbon atoms, preferably 4 or less, more preferably 3 or less, and even more preferably 2 or less, are preferred from the viewpoint of solubility.

Specific examples of the alkylamines include methylamine, dimethylamine, trimethylamine, ethylamine, methylethylamine, diethylamine, triethylamine, methyldiethylamine, dimethylethylamine, n-propylamine, di-n-propylamine, tri-n-propylamine, iso-propylamine, di-iso-propylamine, tri-iso-propylamine, n-butylamine, di-n-butylamine, tri-n-butylamine, iso-butylamine, di-iso-butylamine, tri-iso-butylamine, tert-butylamine, n-pentylamine, and n-hexylamine.

Among them, from the viewpoint of solubility, methylamine, dimethylamine, trimethylamine, ethylamine, methylethylamine, diethylamine, triethylamine, methyldiethylamine, and dimethylethylamine are preferred; and methylamine, dimethylamine, and trimethylamine are more preferred.

In the primary neutralization, from the viewpoint of enhancing dispersibility, it is preferable to add the tantalum salt solution to an amine aqueous solution containing amine equivalent to or more than fluorine contained in the tantalum salt solution in terms of molar ratio, that is, in a molar ratio of 1 or more, more preferably 1.2 or more, and even more preferably 1.4 or more.

In addition, from the viewpoint of reducing the amount of waste solution, it is preferable to add the tantalum salt solution to an amine aqueous solution containing amine in a molar ratio of 2 or less to fluorine contained in the tantalum salt solution, more preferably 1.8 or less, and even more preferably 1.6 or less.

In the primary neutralization step, it is preferable to perform neutralization reaction within 1 minute when adding the tantalum salt solution such as a tantalum fluoride aqueous solution to an amine aqueous solution. In other words, instead of gradually adding the tantalum salt solution over a period of time, it is preferable to add the tantalum salt solution all at once, for example, within 1 minute for neutralization reaction.

In this case, the addition time of the tantalum salt solution is preferably 1 minute or less, more preferably 30 seconds or less, and even more preferably 10 seconds or less.

(Secondary Neutralization Step)

In the secondary neutralization, it is preferable to add the primary reaction liquid obtained in the primary neutralization step to ammonia water to obtain a secondary reaction liquid. When the primary reaction liquid is added to ammonia water, a precipitate (referred to as "tantalum-containing precipitate") is formed in the water.

In the secondary neutralization, it is also preferable to perform reverse neutralization in which the primary reaction liquid obtained in the primary neutralization step is added to ammonia water for reaction, from the viewpoint of further enhancing dispersibility of the present tantalate dispersion.

The ammonia water preferably has an ammonia concentration of 10% by mass to 30% by mass from the viewpoint of enhancing dispersibility of the present tantalate dispersion. Among them, the ammonia concentration is more preferably 15% by mass or more, even more preferably 20% by mass or more, and still more preferably 25% by mass or more. In addition, it is more preferably 29% by mass or less, and even more preferably 28% by mass or less.

In the secondary neutralization step, from the viewpoint of enhancing dispersibility in the subsequent dispersion step, it is preferable to add the primary reaction liquid to ammonia water containing ammonia in a molar ratio of 7.5 or more to fluorine contained in the primary reaction liquid, more preferably 8.0 or more, and even more preferably 8.5 or more.

In addition, from the viewpoint of reducing the amount of waste solution, it is preferable to add the primary reaction liquid to ammonia water containing ammonia having a molar ratio of 10.0 or less to fluorine contained in the primary reaction liquid, more preferably 9.5 or less, and even more preferably 9.0 or less.

In the secondary neutralization step, it is preferable to perform neutralization reaction within 1 minute when adding the primary reaction liquid to ammonia water. In other words, instead of gradually adding the primary reaction liquid over a period of time, it is preferable to add the primary reaction liquid all at once, for example, within 1 minute for neutralization reaction.

In this case, the addition time of the primary reaction liquid is preferably 1 minute or less, more preferably 30 seconds or less, and even more preferably 10 seconds or less.

(Washing Step)

In the secondary reaction liquid obtained by the secondary neutralization, especially in the tantalum-containing precipitate, impurities, which are unnecessary components other than hydrates of tantalum or/and tantalate, or/and ions thereof and amine, such as fluorine compounds including ammonium fluoride, are present in water. Therefore, it is preferable to remove the unnecessary components.

The washing method, for example, the method for removing fluorine compounds, is arbitrary. For example, filtration methods using a membrane, such as reverse osmosis filtration using ammonia water or pure water, ultrafiltration, and microfiltration; centrifugation; and other known methods can be adopted.

The washing step may be performed at room temperature, and no particular temperature adjustment is required.

(Dispersion Step)

Next, the tantalum-containing precipitate obtained by washing in the washing step, for example, the tantalum-containing precipitate obtained by removing fluorine, can be added with a dispersion medium such as water, and amine, and then stirred if necessary to promote the reaction, thereby producing the present tantalate dispersion.

The type of amine to be added is the same as the amine that can be used in the primary neutralization.

As described above, when the amount of amine is large, the dispersibility or/and solubility of tantalum or/and tantalate in water can be enhanced, and when the amount of amine is too large, problems such as interfering with film formation and inhibiting catalytic action may occur. From such a viewpoint, the amount of amine added is preferably adjusted as described above.

Each step in the present dispersion production method may be performed at room temperature, and it is not particularly necessary to forcibly adjust the temperature in each step.

<Applications of Present Tantalate Dispersion>

Since the present tantalate dispersion contains no hardly-volatile organic components, it can be dried at a relatively low temperature (100° C. or lower) to form a film. Therefore, it can be effectively used as, for example, various coating liquids. It can also be used for various other applications, such as catalyst raw materials.

Moreover, various additives can be added to the present tantalate dispersion to be used for various applications.

<Present Tantalate Compound>

Next, the tantalate compound according to an example of the embodiments of the present invention (referred to as "present tantalate compound") will be described.

It is preferable that a part or all of the present tantalate compound is an ammonium salt. In addition, it may contain amine.

The present tantalate compound preferably contains tantalum in an amount of 70% by mass to 95% by mass in terms of $Ta_2O_5$, more preferably 75% by mass or more, and even more preferably 78% by mass or more. In addition, it is more preferable to contain tantalum in an amount of 93% by mass or less, more preferably 90% by mass or less. The present tantalate compound is not necessarily present in the form of $Ta_2O_5$. In the present invention, the reason why the content of tantalum in the present tantalate compound is indicated in terms of $Ta_2O_5$ is based on the practice of the industry when indicating the Ta concentration.

The present tantalate compound preferably has an intensity ratio (5.5°/29°) of an intensity at $2\theta=5.5°$ to an intensity at $2\theta=29°$ being 0.90 or more in an X-ray diffraction pattern obtained by powder X-ray diffraction measurement using CuKα rays.

It has been confirmed that, when the intensity ratio (5.5°/29°) of the intensity at $2\theta=5.5°$ to the intensity at $2\theta=29°$ is large, the reactivity of the present tantalate compound becomes higher. In the X-ray diffraction pattern, the high intensity of the peak appearing at an angle lower than $2\theta=15°$ has been confirmed as one of the characteristics of a polyoxometalate structure. Therefore, it can be presumed that the higher the intensity ratio (5.5°/29°), the higher the ratio of the polyoxometalate structure, and the higher the reactivity of the present tantalate compound.

From such a viewpoint, the intensity ratio (5.5°/29°) in the present tantalate compound is preferably 0.90 or more, more preferably 0.92 or more, and even more preferably 0.94 or more. The upper limit thereof is expected to be approximately 2.00.

The intensity at $2\theta=29°$ and the intensity at $2\theta=5.5°$ are not the intensity at the peak position near the angle, but the intensity at the specified angle.

The present tantalate compound is presumed to be a compound having a polyoxometalate structure. In particular, it is presumed to be a hydrous compound having a structure represented by the formula $[Ta_xO_y]^{n-} \cdot mH_2O$ (6≤x≤10, 19≤y≤28, n=6, and m is an integer of 0 to 50). Specific examples thereof include a hydrous compound having a structure represented by $[Ta_6O_{19}]^{6-} \cdot mH_2O$. However, it is not limited to the hydrous compound.

The basis for this presumption includes, in addition to the characteristics in the X-ray diffraction pattern, high reactivity with alkali metals, as described below, and the fact that when mixed and reacted with NaOH, LiOH, or KOH, a compound having a polyoxometalate structure can be obtained.

(Reactivity with Alkali Metal Compounds)

The present tantalate compound can be reacted by simply mixing with an alkali metal salt such as sodium hydroxide or potassium hydroxide and stirring, without heating to 80° C. or higher, to produce an alkali metal tantalum salt.

For example, 3 g of the present tantalate compound is slurried with 30 mL of pure water, the slurry is added with 30 mL of a sodium hydroxide aqueous solution (25° C.) having a concentration of 2.2% by mass while stirring and then stirred for 15 minutes after the addition to form a reaction liquid, the reaction liquid is added with 100 mL of ethanol to form a precipitate, and the precipitate is dried, thereby obtaining a powder composed of $Na_8Ta_6O_{19} \cdot 15H_2O$.

From the above, it can be said that the present tantalate compound has high reactivity with alkali metal salts, and can be thus reacted with a sodium hydroxide aqueous solution as described above to form a precipitate composed of $Na_8Ta_6O_{19} \cdot 15H_2O$.

For example, 3 g of the present tantalate compound is slurried with 30 mL of pure water, the slurry is added with 30 mL of a potassium hydroxide aqueous solution (25° C.) having a concentration of 3% by mass while stirring and then stirred for 15 minutes after the addition to form a reaction liquid, the reaction liquid is added with 100 mL of ethanol to form a precipitate, and the precipitate is dried, thereby obtaining a powder composed of $K_8Ta_6O_{19} \cdot 16H_2O$.

From the above, it can be said that the present tantalate compound has high reactivity with alkali metal salts, and can be thus reacted with a potassium hydroxide aqueous solution as described above to form a precipitate composed of $K_8Ta_6O_{19} \cdot 16H_2O$.

<Present Compound Production Method>

Next, a preferred method for producing the present tantalate compound (referred to as "present compound production method") will be described.

Examples of the present compound production method include a method for producing a tantalate compound including adding a tantalum salt solution to an amine aqueous solution to obtain a primary reaction liquid (this treatment is referred to as "primary neutralization step"), adding the primary reaction liquid to ammonia water to obtain a secondary reaction solution (this treatment is referred to as "secondary neutralization step"), washing a tantalum-containing precipitate formed in the secondary reaction solution (this treatment is referred to as "washing step"), and optionally drying the washed tantalum-containing precipitate. In other words, by performing the steps up to the washing step in the above-mentioned present dispersion production method, a tantalum-containing precipitate or a dried product thereof can be obtained as the present tantalate compound. That is, the present tantalate compound can be obtained as an intermediate substance when producing the present tantalate dispersion.

However, the present compound production method is not limited to this production method.

Other steps or treatments can be appropriately added in the present compound production method as long as the above-mentioned steps are included.

For ease of explanation, the present compound production method will be described for each step below. However, each step can be a series of treatments in terms of the apparatus and time, or can be different treatment steps with different apparatuses and times.

(Tantalum Salt Solution)

For the explanation of the tantalum salt solution, which is a starting material in the present compound production method, the above-mentioned explanation of the tantalum salt solution in the present dispersion production method applies.

(Primary Neutralization Step)

For the explanation of the primary neutralization step in the present compound production method, the above-mentioned explanation of the primary neutralization step in the present dispersion production method applies.

(Secondary Neutralization Step)

For the explanation of the secondary neutralization step in the present compound production method, the above-mentioned explanation of the secondary neutralization step in the present dispersion production method applies.

(Washing Step)

For the explanation of the washing step in the present compound production method, the above-mentioned explanation of the washing step in the present dispersion production method applies.

(Drying Step)

The washed tantalum-containing precipitate obtained in the washing step may be obtained directly as the present tantalate compound, or the tantalum-containing precipitate may be dried to obtain the present tantalate compound.

For the drying method in this step, a known drying method can be appropriately adopted. In particular, vacuum drying is preferred. Vacuum drying is preferred since the precipitate can be easily dried at, specifically, 100° C. or lower without being heated to a high temperature.

When the drying temperature is too high, the reactivity of the present tantalate compound to be obtained may decrease. Therefore, the drying temperature is preferably 100° C. or lower, more preferably 90° C. or lower, even more preferably 80° C. or lower, still more preferably 70° C. or lower, and particularly preferably 60° C. or lower.

Each step in the present compound production method is preferably performed at room temperature, except for the drying step. It is not particularly necessary to forcibly adjust the temperature in each step.

<Applications of Present Tantalate Compound>

The present tantalate compound can be used to produce the present tantalate dispersion. That is, the present tantalate compound can be mixed with amine and water to produce the present tantalate dispersion.

The present tantalate compound is slightly inferior in reactivity to the present tantalate dispersion, but still has high reactivity with alkali metal salts such as sodium hydroxide and potassium hydroxide. Therefore, an alkali metal tantalate can be easily obtained by simply mixing and reacting with an alkali metal salt such as sodium hydroxide or potassium hydroxide, without using an autoclave or the like to react under high temperature and pressure conditions.

The present tantalate compound can be used for various applications, such as additives for catalysts.

Explanation of Terms

The expression "X to Y" (X and Y are arbitrary numbers) in the present specification also includes the intention of "preferably more than X" or "preferably less than Y" as well as the intention of "X or more and Y or less" unless otherwise stated.

In addition, the expression "X or more" (X is an arbitrary number) or "Y or less" (Y is an arbitrary number) also includes the intention of "preferably more than X" or "preferably less than Y".

EXAMPLES

The present invention will be further described based on the following Examples. However, the following Examples are not intended to limit the present invention.

Example 1

Tantalum hydroxide ($Ta_2O_5$ concentration of 66% by mass), manufactured by Mitsui Mining & Smelting Co., Ltd., in an amount of 137.9 g was dissolved in 120 g of a 55% by mass hydrofluoric acid aqueous solution, and 849 mL of ion-exchanged water was added thereto to obtain a tantalum fluoride aqueous solution ($Ta_2O_5$ concentration of 9.1% by mass).

The tantalum fluoride aqueous solution in an amount of 100 g was added to 100 mL of 50% by mass dimethylamine over a period of less than 1 minute. The mixture was then stirred for 15 minutes to obtain a primary reaction liquid (pH 11). The primary reaction liquid was added to 460 mL of ammonia water ($NH_3$ concentration of 25% by mass) over a period of less than 1 minute to obtain a secondary reaction liquid (pH 12). The secondary reaction liquid was a tantalate compound hydrate slurry, in other words, a tantalum-containing precipitate slurry.

Next, the secondary reaction liquid was decanted using a centrifuge and washed until the amount of free fluorine in the supernatant was 100 mg/L or less to obtain a tantalum-containing precipitate from which fluorine was removed. Ammonia water was used for the washing liquid in this process.

A part of the tantalum-containing precipitate was calcined at 1,000° C. for 4 hours to form $Ta_2O_5$, and the $Ta_2O_5$ concentration contained in the tantalum-containing precipitate was calculated from the mass. The $Ta_2O_5$ concentration was 38% by mass.

The tantalum-containing precipitate in an amount of 11.8 g was added with 29.2 mL of pure water and 9 g of 50% by mass dimethylamine to prepare 50 g of a tantalate dispersion (sample) having a $Ta_2O_5$ concentration of 9% by mass and dimethylamine of 9% by mass.

Example 2

Tantalum hydroxide (Ta$_2$O$_5$ concentration of 66% by mass), manufactured by Mitsui Mining & Smelting Co., Ltd., in an amount of 137.9 g was dissolved in 120 g of a 55% by mass hydrofluoric acid aqueous solution, and 849 mL of ion-exchanged water was added thereto to obtain a tantalum fluoride aqueous solution (Ta$_2$O$_5$ concentration of 9.1% by mass).

The tantalum fluoride aqueous solution in an amount of 100 g was added to 100 mL of 50% by mass dimethylamine over a period of less than 1 minute. The mixture was then stirred for 15 minutes to obtain a primary reaction liquid (pH 11). The primary reaction liquid was added to 460 mL of ammonia water (NH$_3$ concentration of 25% by mass) over a period of less than 1 minute to obtain a secondary reaction liquid (pH 12). The secondary reaction liquid was a tantalate compound hydrate slurry, in other words, a tantalum-containing precipitate slurry.

Next, the secondary reaction liquid was decanted using a centrifuge and washed until the amount of free fluorine in the supernatant was 100 mg/L or less to obtain a tantalum-containing precipitate from which fluorine was removed. Ammonia water was used for the washing liquid in this process.

A part of the tantalum-containing precipitate was calcined at 1,000° C. for 4 hours to form Ta$_2$O$_5$, and the Ta$_2$O$_5$ concentration contained in the tantalum-containing precipitate was calculated from the mass. The Ta$_2$O$_5$ concentration was 38% by mass.

The tantalum-containing precipitate in an amount of 11.8 g was added with 30.2 mL of pure water and 8 g of 50% by mass dimethylamine to prepare 50 g of a tantalate dispersion (sample) having a Ta$_2$O$_5$ concentration of 9% by mass and dimethylamine of 8% by mass.

Example 3

Tantalum hydroxide (Ta$_2$O$_5$ concentration of 66% by mass), manufactured by Mitsui Mining & Smelting Co., Ltd., in an amount of 137.9 g was dissolved in 120 g of a 55% by mass hydrofluoric acid aqueous solution, and 849 mL of ion-exchanged water was added thereto to obtain a tantalum fluoride aqueous solution (Ta$_2$O$_5$ concentration of 9.1% by mass).

The tantalum fluoride aqueous solution in an amount of 100 g was added to 100 mL of 50% by mass dimethylamine over a period of less than 1 minute. The mixture was then stirred for 15 minutes to obtain a primary reaction liquid (pH 11). The primary reaction liquid was added to 460 mL of ammonia water (NH$_3$ concentration of 25% by mass) over a period of less than 1 minute to obtain a secondary reaction liquid (pH 12). The secondary reaction liquid was a tantalate compound hydrate slurry, in other words, a tantalum-containing precipitate slurry.

Next, the secondary reaction liquid was decanted using a centrifuge and washed until the amount of free fluorine in the supernatant was 100 mg/L or less to obtain a tantalum-containing precipitate from which fluorine was removed. Ammonia water was used for the washing liquid in this process.

A part of the tantalum-containing precipitate was calcined at 1,000° C. for 4 hours to form Ta$_2$O$_5$, and the Ta$_2$O$_5$ concentration contained in the tantalum-containing precipitate was calculated from the mass. The Ta$_2$O$_5$ concentration was 38% by mass.

The tantalum-containing precipitate in an amount of 11.8 g was added with 31.2 mL of pure water and 7 g of 50% by mass dimethylamine to prepare 50 g of a tantalate dispersion (sample) having a Ta$_2$O$_5$ concentration of 9% by mass and dimethylamine of 7% by mass.

Example 4

Tantalum hydroxide (Ta$_2$O$_5$ concentration of 66% by mass), manufactured by Mitsui Mining & Smelting Co., Ltd., in an amount of 137.9 g was dissolved in 120 g of a 55% by mass hydrofluoric acid aqueous solution, and 849 mL of ion-exchanged water was added thereto to obtain a tantalum fluoride aqueous solution (Ta$_2$O$_5$ concentration of 9.1% by mass).

The tantalum fluoride aqueous solution in an amount of 100 g was added to 100 mL of 50% by mass dimethylamine over a period of less than 1 minute. The mixture was then stirred for 15 minutes to obtain a primary reaction liquid (pH 11). The primary reaction liquid was added to 460 mL of ammonia water (NH$_3$ concentration of 25% by mass) over a period of less than 1 minute to obtain a secondary reaction liquid (pH 12). The secondary reaction liquid was a tantalate compound hydrate slurry, in other words, a tantalum-containing precipitate slurry.

Next, the secondary reaction liquid was decanted using a centrifuge and washed until the amount of free fluorine in the supernatant was 100 mg/L or less to obtain a tantalum-containing precipitate from which fluorine was removed. Ammonia water was used for the washing liquid in this process.

A part of the tantalum-containing precipitate was calcined at 1,000° C. for 4 hours to form Ta$_2$O$_5$, and the Ta$_2$O$_5$ concentration contained in the tantalum-containing precipitate was calculated from the mass. The Ta$_2$O$_5$ concentration was 38% by mass.

The tantalum-containing precipitate in an amount of 11.8 g was added with 30.2 mL of pure water and 6 g of 50% by mass dimethylamine to prepare 50 g of a tantalate dispersion (sample) having a Ta$_2$O$_5$ concentration of 9% by mass and dimethylamine of 6% by mass.

Example 5

Tantalum hydroxide (Ta$_2$O$_5$ concentration of 66% by mass), manufactured by Mitsui Mining & Smelting Co., Ltd., in an amount of 137.9 g was dissolved in 120 g of a 55% by mass hydrofluoric acid aqueous solution, and 849 mL of ion-exchanged water was added thereto to obtain a tantalum fluoride aqueous solution (Ta$_2$O$_5$ concentration of 9.1% by mass).

The tantalum fluoride aqueous solution in an amount of 100 g was added to 100 mL of 50% by mass dimethylamine over a period of less than 1 minute. The mixture was then stirred for 15 minutes to obtain a primary reaction liquid (pH 11). The primary reaction liquid was added to 460 mL of ammonia water (NH$_3$ concentration of 25% by mass) over a period of less than 1 minute to obtain a secondary reaction liquid (pH 12). The secondary reaction liquid was a tantalate compound hydrate slurry, in other words, a tantalum-containing precipitate slurry.

Next, the secondary reaction liquid was decanted using a centrifuge and washed until the amount of free fluorine in the supernatant was 100 mg/L or less to obtain a tantalum-containing precipitate from which fluorine was removed. Ammonia water was used for the washing liquid in this process.

A part of the tantalum-containing precipitate was calcined at 1,000° C. for 4 hours to form $Ta_2O_5$, and the $Ta_2O_5$ concentration contained in the tantalum-containing precipitate was calculated from the mass. The $Ta_2O_5$ concentration was 38% by mass.

The tantalum-containing precipitate in an amount of 11.8 g was added with 30.2 mL of pure water and 5 g of 50% by mass dimethylamine to prepare 50 g of a tantalate dispersion (sample) having a $Ta_2O_5$ concentration of 9% by mass and dimethylamine of 5% by mass.

Example 6

Tantalum hydroxide ($Ta_2O_5$ concentration of 66% by mass), manufactured by Mitsui Mining & Smelting Co., Ltd., in an amount of 137.9 g was dissolved in 120 g of a 55% by mass hydrofluoric acid aqueous solution, and 849 mL of ion-exchanged water was added thereto to obtain a tantalum fluoride aqueous solution ($Ta_2O_5$ concentration of 9.1% by mass).

The tantalum fluoride aqueous solution in an amount of 100 g was added to 100 mL of 50% by mass dimethylamine over a period of less than 1 minute. The mixture was then stirred for 15 minutes to obtain a primary reaction liquid (pH 11). The primary reaction liquid was added to 460 mL of ammonia water ($NH_3$ concentration of 25% by mass) over a period of less than 1 minute to obtain a secondary reaction liquid (pH 12). The secondary reaction liquid was a tantalate compound hydrate slurry, in other words, a tantalum-containing precipitate slurry.

Next, the secondary reaction liquid was decanted using a centrifuge and washed until the amount of free fluorine in the supernatant was 100 mg/L or less to obtain a tantalum-containing precipitate from which fluorine was removed. Ammonia water was used for the washing liquid in this process.

A part of the tantalum-containing precipitate was calcined at 1,000° C. for 4 hours to form $Ta_2O_5$, and the $Ta_2O_5$ concentration contained in the tantalum-containing precipitate was calculated from the mass. The $Ta_2O_5$ concentration was 38% by mass.

The tantalum-containing precipitate in an amount of 11.8 g was added with 27.0 mL of pure water and 11.2 g of 40% by mass methylamine to prepare 50 g of a tantalate dispersion (sample) having a $Ta_2O_5$ concentration of 9% by mass and methylamine of 9% by mass.

Comparative Example 1

Tantalum hydroxide ($Ta_2O_5$ concentration of 66% by mass), manufactured by Mitsui Mining & Smelting Co., Ltd., in an amount of 137.9 g was dissolved in 120 g of a 55% by mass hydrofluoric acid aqueous solution, and 849 mL of ion-exchanged water was added thereto to obtain a tantalum fluoride aqueous solution ($Ta_2O_5$ concentration of 9.1% by mass).

The tantalum fluoride aqueous solution in an amount of 100 g was added with 400 mL of ammonia water ($NH_3$ concentration of 25% by mass) over a period of less than 1 minute to obtain a reaction liquid (pH 12) (normal neutralization). The reaction liquid was a tantalate compound hydrate slurry, in other words, a tantalum-containing precipitate slurry.

Next, the reaction liquid was subjected to Nutsche filtration using 5C filter paper and washed until the amount of free fluorine in the supernatant was 100 mg/L or less to obtain a tantalum-containing precipitate from which fluorine was removed. Ammonia water was used for the washing liquid in this process.

A part of the tantalum-containing precipitate was calcined at 1,000° C. for 4 hours to form $Ta_2O_5$, and the $Ta_2O_5$ concentration contained in the tantalum-containing precipitate was calculated from the mass. The $Ta_2O_5$ concentration was 59% by mass.

The tantalum-containing precipitate in an amount of 7.6 g was added with 33.4 mL of pure water and 9 g of 50% by mass dimethylamine to prepare 50 g of a tantalate-containing liquid (sample) having a $Ta_2O_5$ concentration of 9% by mass and dimethylamine of 9% by mass.

Comparative Example 2

Tantalum hydroxide ($Ta_2O_5$ concentration of 66% by mass), manufactured by Mitsui Mining & Smelting Co., Ltd., in an amount of 137.9 g was dissolved in 120 g of a 55% by mass hydrofluoric acid aqueous solution, and 849 mL of ion-exchanged water was added thereto to obtain a tantalum fluoride aqueous solution ($Ta_2O_5$ concentration of 9.1% by mass).

The tantalum fluoride aqueous solution in an amount of 100 g was added to 400 mL of ammonia water ($NH_3$ concentration of 25% by mass) over a period of less than 1 minute to obtain a reaction liquid (pH 12) (reverse neutralization). The reaction liquid was a tantalate compound hydrate slurry, in other words, a tantalum-containing precipitate slurry.

Next, the reaction liquid was subjected to Nutsche filtration using 5C filter paper and washed until the amount of free fluorine in the supernatant was 100 mg/L or less to obtain a tantalum-containing precipitate from which fluorine was removed. Ammonia water was used for the washing liquid in this process.

A part of the tantalum-containing precipitate was calcined at 1,000° C. for 4 hours to form $Ta_2O_5$, and the $Ta_2O_5$ concentration contained in the tantalum-containing precipitate was calculated from the mass. The $Ta_2O_5$ concentration was 55% by mass.

The tantalum-containing precipitate in an amount of 8.2 g was added with 32.8 mL of pure water and 9 g of 50% by mass dimethylamine to prepare 50 g of a tantalate-containing liquid (sample) having a $Ta_2O_5$ concentration of 9% by mass and dimethylamine of 9% by mass.

Example 7

Tantalum hydroxide ($Ta_2O_5$ concentration of 66% by mass), manufactured by Mitsui Mining & Smelting Co., Ltd., in an amount of 137.9 g was dissolved in 120 g of a 55% by mass hydrofluoric acid aqueous solution, and 849 mL of ion-exchanged water was added thereto to obtain a tantalum fluoride aqueous solution ($Ta_2O_5$ concentration of 9.1% by mass).

The tantalum fluoride aqueous solution in an amount of 100 g was added to 100 mL of 50% by mass dimethylamine over a period of less than 1 minute. The mixture was then stirred for 15 minutes to obtain a primary reaction liquid (pH 11). The primary reaction liquid was added to 460 mL of ammonia water ($NH_3$ concentration of 25% by mass) over a period of less than 1 minute to obtain a secondary reaction liquid (pH 12). The secondary reaction liquid was a tantalate compound hydrate slurry, in other words, a tantalum-containing precipitate slurry.

Next, the secondary reaction liquid was decanted using a centrifuge and washed until the amount of free fluorine in the supernatant was 100 mg/L or less to obtain a tantalum-containing precipitate from which fluorine was removed. Ammonia water was used for the washing liquid in this process.

A part of the tantalum-containing precipitate was calcined at 1,000° C. for 4 hours to form $Ta_2O_5$, and the $Ta_2O_5$ concentration contained in the tantalum-containing precipitate was calculated from the mass. The $Ta_2O_5$ concentration was 38% by mass.

The tantalum-containing precipitate in an amount of 19.7 g was added with 15.3 mL of pure water and 15 g of 50% by mass dimethylamine to prepare 50 g of a tantalate dispersion (sample) having a $Ta_2O_5$ concentration of 15% by mass and dimethylamine of 15% by mass.

Example 8

A tantalate dispersion (sample) having a $Ta_2O_5$ concentration of 0.01% by mass and dimethylamine of 0.01% by mass in an amount of 10 kg was prepared in the same manner as in Example 7 except that the amount of the tantalum-containing precipitate ($Ta_2O_5$ concentration of 38% by mass) used for preparing the tantalate dispersion was changed to 2.6 g, the amount of the pure water was changed to 9,995.4 mL, and the amount of the 50% by mass dimethylamine was changed to 2 g.

Example 9

Tantalum hydroxide ($Ta_2O_5$ concentration of 66% by mass), manufactured by Mitsui Mining & Smelting Co., Ltd., in an amount of 137.9 g was dissolved in 120 g of a 55% by mass hydrofluoric acid aqueous solution, and 849 mL of ion-exchanged water was added thereto to obtain a tantalum fluoride aqueous solution ($Ta_2O_5$ concentration of 9.1% by mass).

The tantalum fluoride aqueous solution in an amount of 100 g was added to 100 mL of 50% by mass dimethylamine over a period of less than 1 minute. The mixture was then stirred for 15 minutes to obtain a primary reaction liquid (pH 11). The primary reaction liquid was added to 460 mL of ammonia water ($NH_3$ concentration of 25% by mass) over a period of less than 1 minute to obtain a secondary reaction liquid (pH 12). The secondary reaction liquid was a tantalate compound hydrate slurry, in other words, a tantalum-containing precipitate slurry.

Next, the secondary reaction liquid was decanted using a centrifuge and washed until the amount of free fluorine in the supernatant was 100 mg/L or less to obtain a tantalum-containing precipitate from which fluorine was removed. Ammonia water was used for the washing liquid in this process.

The tantalum-containing precipitate from which fluorine was removed was vacuum-dried at 60° C. for 15 hours to obtain a tantalate compound (sample).

Example 10

A tantalate compound (sample) was obtained in the same manner as in Example 9 except that 125 mL of 40% by mass dimethylamine was used, instead of 100 mL of the 50% by mass dimethylamine used in Example 9.

Comparative Example 3

Tantalum hydroxide ($Ta_2O_5$ concentration of 66% by mass), manufactured by Mitsui Mining & Smelting Co., Ltd., in an amount of 137.9 g was dissolved in 120 g of a 55% by mass hydrofluoric acid aqueous solution, and 849 mL of ion-exchanged water was added thereto to obtain a tantalum fluoride aqueous solution ($Ta_2O_5$ concentration of 9.1% by mass).

The tantalum fluoride aqueous solution in an amount of 100 g was added with 400 mL of ammonia water ($NH_3$ concentration of 25% by mass) over a period of less than 1 minute to obtain a reaction liquid (pH 12) (normal neutralization). The reaction liquid was a tantalate compound hydrate slurry, in other words, a tantalum-containing precipitate slurry.

Next, the reaction liquid was subjected to Nutsche filtration using 5C filter paper and washed until the amount of free fluorine in the supernatant was 100 mg/L or less to obtain a tantalum-containing precipitate from which fluorine was removed. Ammonia water was used for the washing liquid in this process.

The tantalum-containing precipitate from which fluorine was removed was vacuum-dried at 60° C. for 15 hours to obtain a tantalate compound (sample).

Comparative Example 4

Tantalum hydroxide ($Ta_2O_5$ concentration of 66% by mass), manufactured by Mitsui Mining & Smelting Co., Ltd., in an amount of 137.9 g was dissolved in 120 g of a 55% by mass hydrofluoric acid aqueous solution, and 849 mL of ion-exchanged water was added thereto to obtain a tantalum fluoride aqueous solution ($Ta_2O_5$ concentration of 9.1% by mass).

The tantalum fluoride aqueous solution in an amount of 100 g was added to 400 mL of ammonia water ($NH_3$ concentration of 25% by mass) over a period of less than 1 minute to obtain a reaction liquid (pH 12) (reverse neutralization). The reaction liquid was a tantalate compound hydrate slurry, in other words, a tantalum-containing precipitate slurry.

Next, the reaction liquid was subjected to Nutsche filtration using 5C filter paper and washed until the amount of free fluorine in the supernatant was 100 mg/L or less to obtain a tantalum-containing precipitate from which fluorine was removed. Ammonia water was used for the washing liquid in this process.

The tantalum-containing precipitate from which fluorine was removed was vacuum-dried at 60° C. for 15 hours to obtain a tantalate compound (sample).

<Reactivity Test with NaOH>

The tantalate dispersion (sample) obtained in Example 1 or the tantalum-containing liquid (sample) obtained in Comparative Example 2 (25° C.) in an amount of 30 g was weighed, and 30 mL of a 2.2% by mass sodium hydroxide aqueous solution (25° C.) was added thereto over a period of 1 minute while stirring with a magnetic stirrer (stirring speed: 150 rpm). After the addition, the mixture was stirred for 15 minutes to obtain a reaction solution. The reaction solution was added with 100 mL of ethanol to obtain a precipitate. The precipitate was subjected to Nutsche filtration using 5C filter paper, washed with pure water, and then dried by still-standing for 15 hours in an atmosphere of 60° C. and vacuum (0.08 MPa or less) using a reduced pressure drying furnace. The resulting dried product was pulverized in an agate mortar, and the resulting powder was subjected to X-ray diffraction measurement.

The tantalate compound (sample) obtained in Example 9 or the tantalate compound obtained in Comparative Example 3 in an amount of 3 g was weighed, 30 mL of pure water was added thereto to form a slurry, and 30 mL of a 2.2% by mass sodium hydroxide aqueous solution (25° C.) was added to the slurry over a period of 1 minute while stirring with a magnetic stirrer (stirring speed: 150 rpm). After the addition, the mixture was stirred for 15 minutes to obtain a reaction solution. The reaction solution was added with 100 mL of ethanol to obtain a precipitate. The precipitate was subjected to Nutsche filtration using 5C filter paper, washed with pure water, and then dried by still-standing for 15 hours in an atmosphere of 60° C. and vacuum (0.08 MPa or less) using a reduced pressure drying furnace. The resulting dried product was pulverized in an agate mortar, and the resulting powder was subjected to X-ray diffraction measurement.

The above-mentioned X-ray diffraction measurement conditions and the X-ray diffraction conditions are the same as those in the following <XRD measurement>.

Figure 2:
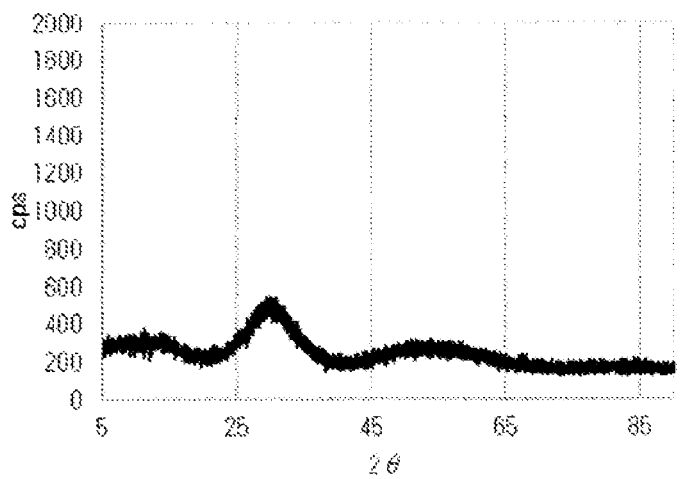
FIG. 2 is an XRD pattern of a precipitate obtained by subjecting a tantalate dispersion (sample) obtained in Comparative Example 2 to a reactivity test with NaOH.

FIG. 1 and FIG. 2 each show an X-ray diffraction pattern of the powder obtained by reacting the tantalate dispersion (sample) obtained in Example 1 or the tantalum-containing liquid (sample) obtained in Comparative Example 2 with a sodium hydroxide aqueous solution.

The powder obtained by reacting the tantalate dispersion (sample) obtained in Example 1 with a sodium hydroxide aqueous solution and the powder obtained by reacting the tantalate compound (sample) obtained in Example 9 with a sodium hydroxide aqueous solution were identified from the result of the X-ray diffraction measurement to be composed of $Na_8Ta_6O_{19} \cdot 15H_2O$ of the ICDD card No. 00-024-1145.

On the other hand, the powder obtained by reacting the tantalum-containing liquid (sample) obtained in Comparative Example 2 with a sodium hydroxide aqueous solution and the powder obtained by reacting the tantalate compound (sample) obtained in Comparative Example 3 with a sodium hydroxide aqueous solution were amorphous and no tantalum oxide was obtained, from the results of the X-ray diffraction measurement.

<Reactivity Test with KOH>

The tantalate dispersion (sample) obtained in Example 1 in an amount of 30 g was weighed, and 30 mL of a 3% by mass potassium hydroxide aqueous solution was added thereto over a period of 1 minute while stirring with a magnetic stirrer (stirring speed: 150 rpm). After the addition, the mixture was stirred for 15 minutes to obtain a reaction solution. The reaction solution was added with 100 mL of ethanol to obtain a precipitate. The precipitate was subjected to Nutsche filtration using 5C filter paper, washed with pure water, and then dried by still-standing for 15 hours in an atmosphere of 60° C. and vacuum (0.08 MPa or less) using a reduced pressure drying furnace. The resulting dried product was pulverized in an agate mortar, and the resulting powder was subjected to X-ray diffraction measurement.

The tantalate compound (sample) obtained in Example 9 in an amount of 3 g was weighed, and 30 mL of a 3% by mass potassium hydroxide aqueous solution was added thereto over a period of 1 minute while stirring with a magnetic stirrer (stirring speed: 150 rpm). After the addition, the mixture was stirred for 15 minutes to obtain a reaction solution. The reaction solution was added with 100 mL of ethanol to obtain a precipitate. The precipitate was subjected to Nutsche filtration using 5C filter paper, washed with pure water, and then dried by still-standing for 15 hours in an atmosphere of 60° C. and vacuum (0.08 MPa or less) using a reduced pressure drying furnace. The resulting dried product was pulverized in an agate mortar, and the resulting powder was subjected to X-ray diffraction measurement.

The X-ray diffraction measurement conditions and the X-ray diffraction conditions are the same as those in the following <XRD measurement>.

Figure 3:
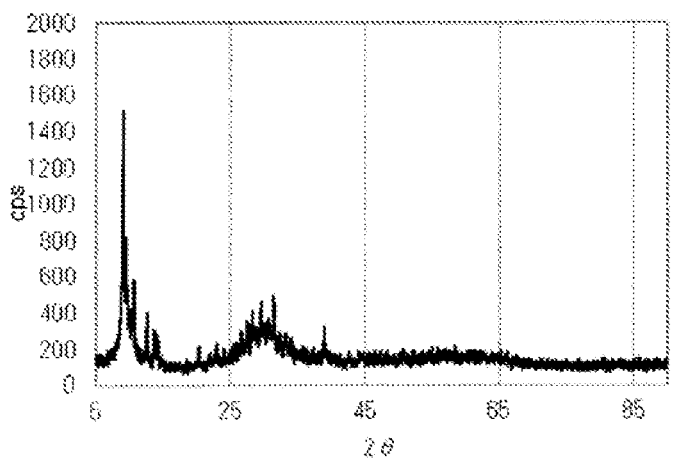
FIG. 3 is an XRD pattern of a precipitate obtained by subjecting a tantalate dispersion (sample) obtained in Example 1 to a reactivity test with KOH.
Figure 4:
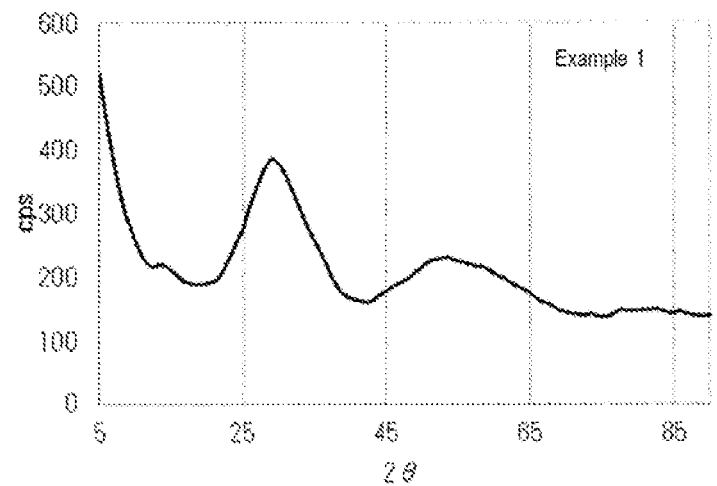
FIG. 4 is an X-ray diffraction pattern obtained by subjecting a powder obtained by drying a tantalate dispersion (sample) obtained in Example 1 to powder X-ray diffraction measurement.
Figure 5:
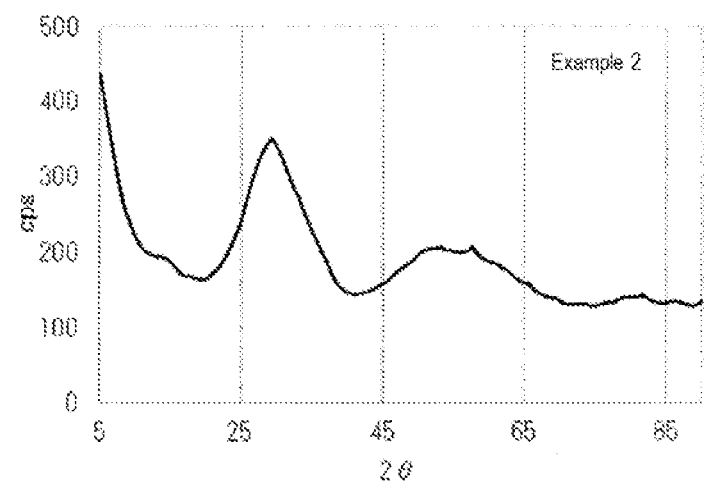
FIG. 5 is an X-ray diffraction pattern obtained by subjecting a powder obtained by drying a tantalate dispersion (sample) obtained in Example 2 to powder X-ray diffraction measurement.
Figure 6:
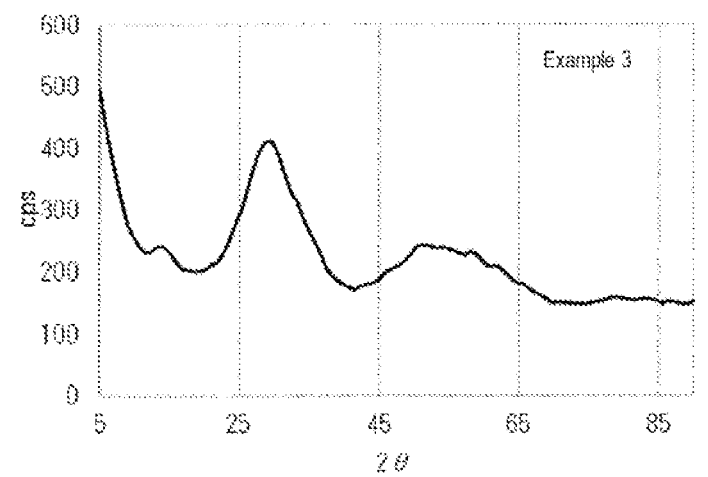
FIG. 6 is an X-ray diffraction pattern obtained by subjecting a powder obtained by drying a tantalate dispersion (sample) obtained in Example 3 to powder X-ray diffraction measurement.
Figure 7:
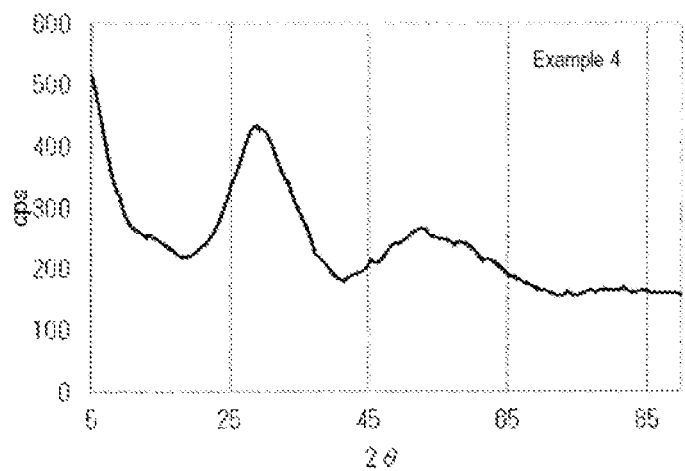
FIG. 7 is an X-ray diffraction pattern obtained by subjecting a powder obtained by drying a tantalate dispersion (sample) obtained in Example 4 to powder X-ray diffraction measurement.
Figure 8:
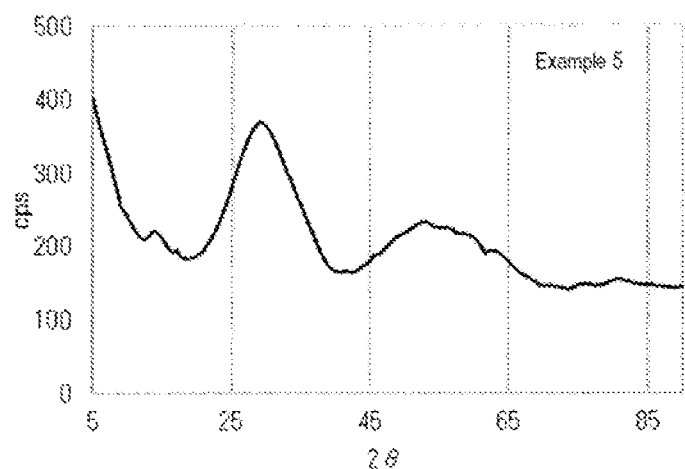
FIG. 8 is an X-ray diffraction pattern obtained by subjecting a powder obtained by drying a tantalate dispersion (sample) obtained in Example 5 to powder X-ray diffraction measurement.
Figure 9:
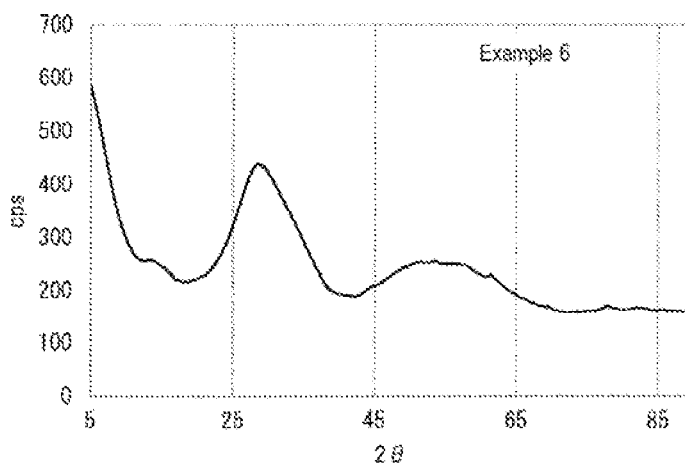
FIG. 9 is an X-ray diffraction pattern obtained by subjecting a powder obtained by drying a tantalate dispersion (sample) obtained in Example 6 to powder X-ray diffraction measurement.
Figure 10:
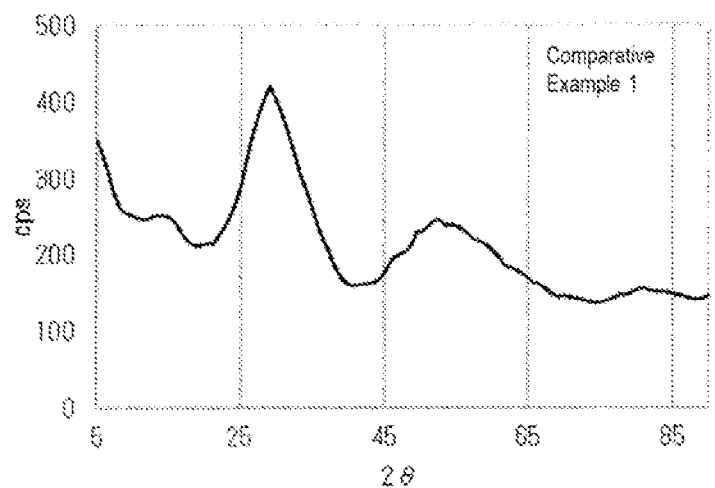
FIG. 10 is an X-ray diffraction pattern obtained by subjecting a powder obtained by drying a tantalate-containing liquid (sample) obtained in Comparative Example 1 to powder X-ray diffraction measurement.
Figure 11:
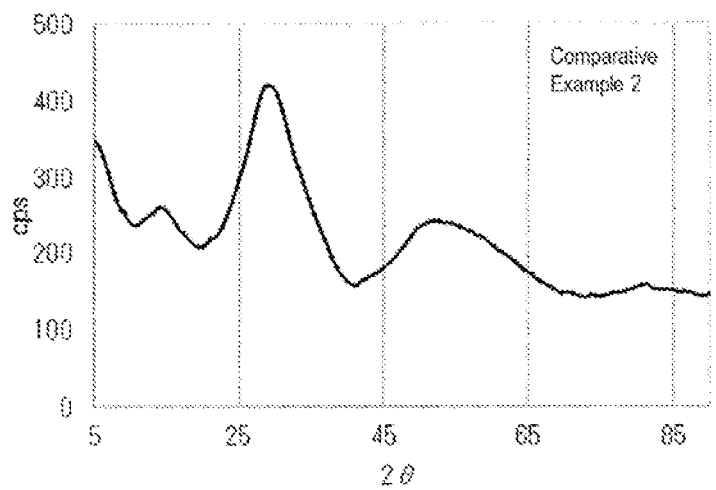
FIG. 11 is an X-ray diffraction pattern obtained by subjecting a powder obtained by drying a tantalate-containing liquid (sample) obtained in Comparative Example 2 to powder X-ray diffraction measurement.

FIG. 3 shows an X-ray diffraction pattern of the powder obtained by reacting the tantalate dispersion (sample) obtained in Example 1 with a potassium hydroxide aqueous solution.

The powder obtained by reacting the tantalate dispersion (sample) obtained in Example 1 with a potassium hydroxide aqueous solution was identified from the result of the X-ray diffraction measurement to be composed of $K_8Ta_6O_{19} \cdot 16H_2O$ of the ICDD card No. 01-073-8508.

The powder obtained by reacting the tantalate compound (sample) obtained in Example 9 with a potassium hydroxide aqueous solution was also identified from the result of the X-ray diffraction measurement to be composed of $K_8Ta_6O_{19} \cdot 16H_2O$ of the ICDD card No. 01-073-8508.

<XRD Measurement>

The tantalate dispersion (sample) obtained in each of Examples 1 to 8 or the tantalum-containing liquid (sample) obtained in each of Comparative Examples 1 to 2 in an amount of 10 g was dried by still-standing for 15 hours in an atmosphere of 60° C. and vacuum (0.08 MPa or less) using a reduced pressure drying furnace, to obtain a powder (sample) of the tantalate compound.

These tantalum oxide powders (samples) and the tantalate compounds obtained in Examples 9 and 10 and Comparative Examples 3 and 4 were subjected to powder X-ray diffraction measurement using CuKα rays to obtain X-ray diffraction patterns.

FIGS. 4 to 11 each show an X-ray diffraction pattern of the tantalum oxide powders (samples) obtained from the tantalate dispersions (samples) obtained in Examples 1 to 6 or the tantalate-containing liquids (samples) obtained in Comparative Examples 1 to 2.

=X-Ray Diffraction Measurement Conditions=

Apparatus: Mini Flex II (manufactured by Rigaku Corp.)
Measurement range (2θ): 5° to 90°
Sampling width: 0.02°
Scanning speed: 2.0°/min
X-ray: CuKα ray
Voltage: 30 kV
Current: 15 mA
Divergence slit: 1.25°
Scattering slit: 1.25°
Light-receiving slit: 0.3 mm =X-Ray Diffraction Analysis Conditions=

Data analysis software PDXL2, manufactured by Rigaku Corp., was used.
Peaks were smoothed with a b-spline curve to clarify peak tops.

The intensities at 2θ=5.5° and 2θ=29° were determined from each of the X-ray diffraction patterns thus measured, and the ratio of the intensity at 2θ=5.5° to the intensity at 2θ=29° (5.5°/29° intensity ratio) was calculated. The results of the dried product of the tantalate dispersion (sample) in each of Examples 1 to 8 and Comparative Example 2 are shown in Table 3, and the results of the tantalate compound (sample) in each of Examples 9 to 10 and Comparative Examples 3 to 4 are shown in Table 4.

<Transmittance Measurement>

The transmittance of the tantalate dispersion (sample) obtained in each of Examples 1 to 8 or the tantalate-containing liquid (sample) obtained in each of Comparative Examples 1 to 2 was measured using a spectrophotometer.

=Transmittance Measurement Conditions=
Apparatus: UH4150-type spectrophotometer
Measurement mode: Wavelength scanning
Data mode: % T (transmission)
Measurement wavelength range: 200 to 2,600 nm
Scanning speed: 600 nm/min
Sampling interval: 2 nm The transmittance at a wavelength of 400 nm was calculated from the transmittance thus measured. The results are shown in Table 5.

TABLE 4

|  |  | Example 9 | Example 10 | Comparative Example 3 | Comparative Example 4 |
|---|---|---|---|---|---|
| $2\theta = 5.5°$ | Intensity (cps) | 471.7 |  | 361.7 | 276.7 |
| $2\theta = 29°$ | Intensity (cps) | 473.3 |  | 546.7 | 401.7 |
| 5.5°/29° | Intensity ratio | 1.00 | 0.92 | 0.66 | 0.69 |

TABLE 1

|  |  |  | Examples | | | | | | | | Comparative Examples | |
|---|---|---|---|---|---|---|---|---|---|---|---|---|
|  |  |  | 1 | 2 | 3 | 4 | 5 | 6 | 7 | 8 | 1 | 2 |
| Neutralization conditions | Tantalum fluoride aqueous solution $Ta_2O_5$ concentration | % by mass | 9.1 | 9.1 | 9.1 | 9.1 | 9.1 | 9.1 | 9.1 | 9.1 | 9.1 | 9.1 |
|  | Tantalum fluoride aqueous solution amount | g | 100 | 100 | 100 | 100 | 100 | 100 | 100 | 100 | 100 | 100 |
|  | 50% dimethylamine amount | mL | 100 | 100 | 100 | 100 | 100 | 100 | 100 | 100 |  |  |
|  | Neutralization method | — | reverse | reverse | reverse | reverse | reverse | reverse | reverse | reverse |  |  |
|  | Neutralization period | min | <1 | <1 | <1 | <1 | <1 | <1 | <1 | <1 |  |  |
|  | pH afer neutralizaton | — | 11 | 11 | 11 | 11 | 11 | 11 | 11 | 11 |  |  |
|  | 25% ammonia water amount | mL | 460 | 460 | 460 | 460 | 460 | 460 | 460 | 460 | 460 | 460 |
|  | Neutralization method | — | reverse | reverse | reverse | reverse | reverse | reverse | reverse | reverse | reverse | reverse |
|  | Neutralization period | min | <1 | <1 | <1 | <1 | <1 | <1 | <1 | <1 | <1 | <1 |
|  | pH afer neutralizaton | — | 12 | 12 | 12 | 12 | 12 | 12 | 12 | 12 | 12 | 12 |
| Samples | Tantalum content (in terms of $Ta_2O_5$) | % by mass | 9.0 | 9.0 | 9.0 | 9.0 | 9.0 | 9.0 | 15 | 0.01 | 9.0 | 9.0 |
|  | Liquid amount | g | 50 | 50 | 50 | 50 | 50 | 50 | 50 | 10000 | 50 | 50 |
|  | Tantalum content (in terms of $Ta_2O_5$) | g | 4.5 | 4.5 | 4.5 | 4.5 | 4.5 | 4.5 | 6.0 | 1.0 | 4.5 | 4.5 |
|  | Methylamine | % by mass | 0 | 0 | 0 | 0 | 0 | 9.0 | 0 | 0 | 0 | 0 |
|  | Dimethylamine | % by mass | 9.0 | 8.0 | 7.0 | 6.0 | 5.0 | 0.0 | 15 | 0.01 | 9.0 | 9.0 |

TABLE 2

|  |  |  | Examples | | Comparative Examples | |
|---|---|---|---|---|---|---|
|  |  | Unit | 9 | 10 | 3 | 4 |
| Neutralization conditions | Tantalum fluoride aqueous solution $Ta_2O_5$ concentration | % by mass | 9.1 | 9.1 | 9.1 | 9.1 |
|  | Tantalum fluoride aqueous solution amount | g | 100 | 100 | 100 | 100 |
|  | amount | % by mass | 50 | 40 |  |  |
|  | Dimethylamine amount | mL | 100 | 125 |  |  |
|  | Neutralization method | — | reverse | reverse |  |  |
|  | Neutralization period | min | <1 | <1 |  |  |
|  | pH after neutralization | — | 11 | 11 |  |  |
|  | 25% ammonia water amount | mL | 460 | 460 | 460 | 460 |
|  | Neutralization method | — | reverse | reverse | normal | reverse |
|  | Neutralization period | min | <1 | <1 | <1 | <1 |
|  | pH after neutralization | — | 12 | 12 | 12 | 12 |
| Samples | Tantalum content (in terms of $Ta_2O_5$) | % by mass | 85.1 | 84.6 | 85.9 | 86.1 |

TABLE 3

|  |  | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|---|
| $2\theta = 5.5°$ | Intensity (cps) | 482.3 | 411.6 | 460.9 | 493.6 | 383.2 | 559.0 | 472.6 | 480.0 | 340.9 | 343.0 |
| $2\theta = 29°$ | Intensity (cps) | 387.4 | 346.5 | 412.3 | 431.3 | 369.4 | 435.7 | 425.7 | 384.0 | 419.0 | 420.2 |
| 5.5°/29° | Intensity ratio | 1.24 | 1.19 | 1.12 | 1.14 | 1.04 | 1.28 | 1.11 | 1.25 | 0.81 | 0.82 |

TABLE 5

|  | Example 1 | Example 2 | Example 3 | Example 4 | Example 5 | Example 8 | Example 7 | Example 8 | Comparative Example 1 | Comparative Example 2 |
|---|---|---|---|---|---|---|---|---|---|---|
| Transmittance at 400 nm | 100.0 | 98.3 | 81.9 | 73.4 | 56.3 | 100.0 | 51.3 | 100 | 0.7 | 1.0 |

CONSIDERATION

It was confirmed that when the tantalate dispersions (samples) obtained in Examples 1 to 6 were allowed to stand at room temperature for 48 hours and then observed, no precipitation was observed in any of the samples and they were in the state of dispersion.

On the other hand, it was confirmed that when the tantalate-containing liquids (samples) obtained in Comparative Examples 1 and 2 were allowed to stand at room temperature for 48 hours and then observed, precipitation was observed in both samples.

It was obvious that the tantalate dispersions (samples) obtained in Examples 1 to 6 contained only unavoidable impurities in water other than hydrates of tantalum or/and tantalate, or/and ions thereof, and amine, based on the production method. The unavoidable impurities were expected to include fluorine compounds and ammonia. Therefore, it was obvious that the tantalate dispersions (samples) obtained in Examples 1 to 6 contained at least no organic components, especially hardly-volatile organic components.

From the results of the above-mentioned Examples and the tests carried out by the present inventors so far, it was confirmed that the present tantalate dispersion containing tantalum or/and tantalate and amine in water, which had an intensity ratio ($5.5°/29°$) of the intensity at $2\theta=5.5°$ to the intensity at $2\theta=29°$ being 1.00 or more in the X-ray diffraction pattern obtained by subjecting the powder obtained by drying the tantalate dispersion to powder X-ray diffraction measurement using CuKα rays, had high dispersibility in water even without containing hardly-volatile organic components such as oxycarboxylic acid, oxalic acid, and EDTA. It was also found that increasing the amine content further enhanced the dispersibility in water and increased the transmittance.

It was also found that the present tantalate dispersion had high reactivity with alkali metal salts such as sodium hydroxide and potassium hydroxide, and thus the alkali metal tantalate could be easily obtained by simply mixing and reacting with the alkali metal salt such as sodium hydroxide or potassium hydroxide, without using an autoclave or the like to react under high temperature and pressure conditions.

It is one of the characteristics of the polyoxometalate structure that the intensity of the peak appearing at an angle lower than $2\theta=15°$ is high in the X-ray diffraction pattern, and the present tantalate dispersion has high reactivity with alkali metals, so that a compound having a polyoxometalate structure can be obtained when mixed and reacted with NaOH, LiOH, or KOH. Therefore, it can be presumed that, in the present tantalate dispersion, tantalum or/and tantalate is present in water as ions having a polyoxometalate structure formed by ion bonding with amine.

In addition, from the results of the above-mentioned Examples and the tests carried out by the present inventors so far, it was found that the present tantalate compound having an intensity ratio ($5.5°/29°$) of the intensity at $2\theta=5.5°$ to the intensity at $2\theta=29°$ being 0.90 or more in the X-ray diffraction pattern had high reactivity with alkali metal salts such as sodium hydroxide and potassium hydroxide, and thus the alkali metal tantalate could be easily obtained by simply mixing and reacting with the alkali metal salt such as sodium hydroxide or potassium hydroxide, without using an autoclave or the like to react under high temperature and pressure conditions.

The present tantalate compound can be presumed to be a compound having a polyoxometalate structure, based on the characteristics in the X-ray diffraction pattern and the fact that alkali metal tantalates having a polyoxometalate structure can be obtained when reacted with alkali metal salts.

The invention claimed is:

1. A tantalate dispersion comprising tantalum or/and tantalate and amine in water,
   the tantalate dispersion having an intensity ratio ($5.5°/29°$) of an intensity at $2\theta=5.5°$ to an intensity at $2\theta=29°$ being 1.00 or more in an X-ray diffraction pattern obtained by subjecting a powder obtained by drying the tantalate dispersion to powder X-ray diffraction measurement using CuKα rays, and having a transmittance at 400 nm that is 40% or more.

2. The tantalate dispersion according to claim 1, comprising 0.01% by mass to 30% by mass of amine.

3. The tantalate dispersion according to claim 1, comprising 0.01% by mass to 40% by mass of tantalum in terms of $Ta_2O_5$.

\* \* \* \* \*